United States Patent
Subramanian et al.

(10) Patent No.: US 8,850,322 B2
(45) Date of Patent: Sep. 30, 2014

(54) CUSTOMIZED DIAGRAMMATIC VIEW OF A NETWORK TOPOLOGY

(75) Inventors: Vijayaraman Subramanian, Hyderabad (IN); Ambati Veera Venkata Praveen Kumar Reddy, Hyderabad (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 298 days.

(21) Appl. No.: 13/299,393

(22) Filed: Nov. 18, 2011

(65) Prior Publication Data
US 2013/0132850 A1    May 23, 2013

(51) Int. Cl.
*G06F 15/177*    (2006.01)
*H04L 12/24*    (2006.01)

(52) U.S. Cl.
CPC .............. *H04L 41/12* (2013.01); *H04L 41/22* (2013.01)
USPC ........... 715/735; 715/734; 715/736; 715/737; 715/738

(58) Field of Classification Search
USPC ............ 715/734–738; 370/254; 709/220–226
See application file for complete search history.

(56) References Cited

U.S. PATENT DOCUMENTS

| | | | |
|---|---|---|---|
| 6,225,999 B1 * | 5/2001 | Jain et al. ....................... | 715/734 |
| 6,687,832 B1 * | 2/2004 | Harada et al. ................... | 726/22 |
| 6,839,747 B1 * | 1/2005 | Blumenau et al. ............ | 709/223 |
| 7,120,127 B2 * | 10/2006 | Fieremans .................... | 370/254 |
| 7,310,666 B2 * | 12/2007 | Benfield et al. ............... | 709/223 |
| 2002/0156883 A1 * | 10/2002 | Natarajan et al. ............. | 709/224 |
| 2002/0158897 A1 * | 10/2002 | Besaw et al. ................. | 345/734 |
| 2003/0009547 A1 * | 1/2003 | Benfield et al. ............... | 709/223 |
| 2003/0009552 A1 * | 1/2003 | Benfield et al. ............... | 709/224 |
| 2004/0059811 A1 * | 3/2004 | Sugauchi et al. .............. | 709/224 |
| 2005/0038884 A1 * | 2/2005 | Boylan et al. ................. | 709/223 |
| 2005/0226167 A1 * | 10/2005 | Braun et al. .................. | 370/254 |
| 2006/0048077 A1 * | 3/2006 | Boyles et al. ................. | 715/853 |
| 2007/0271521 A1 * | 11/2007 | Harriger et al. ............... | 715/762 |
| 2008/0019499 A1 * | 1/2008 | Benfield et al. ........... | 379/221.15 |
| 2010/0064225 A1 * | 3/2010 | Cunningham et al. ........ | 715/736 |
| 2011/0029882 A1 * | 2/2011 | Jaisinghani ................... | 715/736 |

* cited by examiner

*Primary Examiner* — Weilun Lo
*Assistant Examiner* — Rashedul Hassan

(57) ABSTRACT

A method includes receiving a request for network topology information for a network. The request includes an identifier for a requesting entity and an identifier for the network. The method also includes accessing network topology information for the network based on the identifier for the network. The network topology information identifies a plurality of network elements in the network and defines a relationship between the network elements. A diagrammatic view of the network topology is determined based on the network topology information for the network. The method includes determining one or more aspects of at least one network element based on the identifier for the requesting entity. The method further includes associating the one or more aspects to the at least one network element to form a customized diagrammatic view of the network topology. The method also includes providing the customized diagrammatic view of the network topology.

20 Claims, 10 Drawing Sheets

CUSTOMIZED DIAGRAMMATIC VIEW OF A NETWORK TOPOLOGY

BACKGROUND INFORMATION

Information technology (IT) applications or systems are often implemented in association with a variety of networks, such as customer premises networks, distribution networks, or provider networks, etc. In some instances, representations of a network topology are based on particular applications and relevant network elements in the network.

DETAILED DESCRIPTION OF PREFERRED EMBODIMENTS

The following detailed description refers to the accompanying drawings. The same reference numbers in different drawings may identify the same or similar elements. Also, the following detailed description is exemplary and explanatory only and is not restrictive of the invention, as claimed.

Embodiments described herein relate to devices, methods, and systems for determining a customized diagrammatic view of a network topology for a network. Consistent with the embodiments described herein, a diagrammatic view of the network topology may be determined based on network topology information for a network. An administrator may customize the diagrammatic view of the network topology based on specific attributes of each network element in the network, and specific requirements of a particular application. The administrator may store the customized network topology, which may be used by developers of graphical user interfaces (GUI) for particular networks and applications. The developers may incorporate the customized diagrammatic view and develop application logic based on the customized diagrammatic view and particular applications.

Figure 1:
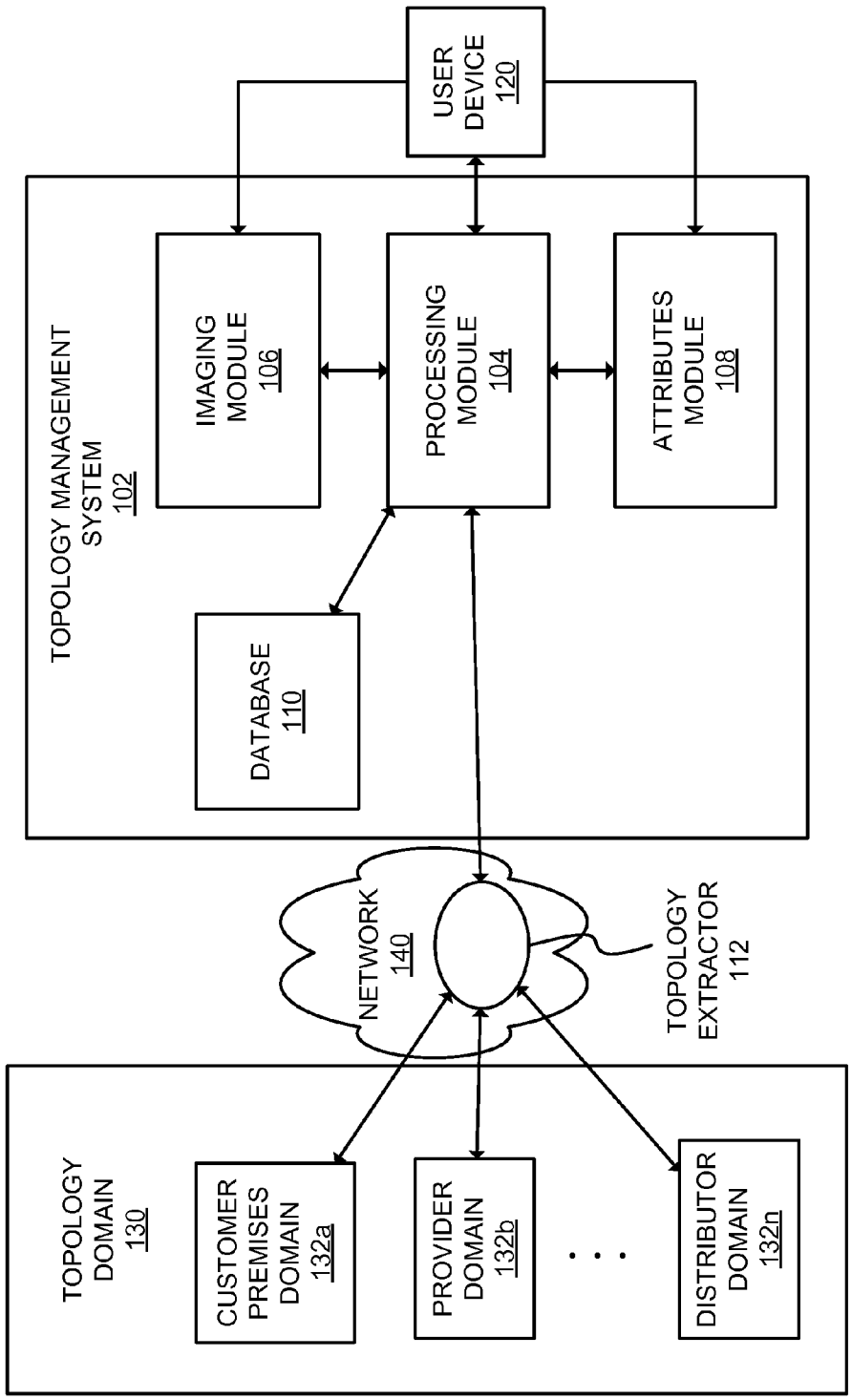
FIG. 1 illustrates an exemplary network in which systems and methods described herein may be implemented.

FIG. 1 is a functional block diagram of an exemplary network 100 in which systems and/or methods described herein may be implemented. As illustrated, network 100 may include a network 140, a topology domain 130, a topology management system 102, and a user device 120. Components of network 100 may be interconnected via wired and/or wireless connections.

The configuration of components of network 100 illustrated in FIG. 1 is for illustrative purposes. Although not shown, network 100 may also include other components of a network, such as security devices, etc. Other configurations may be implemented. Therefore, network 100 may include additional, fewer and/or different components than those depicted in FIG. 1. Also, in some instances, one or more of the components of network 100 may perform one or more functions described as being performed by another one or more of the components of network 100.

Network 140 may include one or more wired and/or wireless networks that are capable of receiving and transmitting data, voice and/or video signals, including multimedia signals that include voice, data and video information. Network 140 may include one or more wireless/mobile networks and/or a public switched telephone network (PSTN). Network 140 may include one or more packet switched networks, such as an Internet protocol (IP) based network, a LAN, a wide area network (WAN), a personal area network (PAN), an intranet, the Internet, or another type of network that is capable of transmitting data. Network 140 may include one or more high-speed data networks, such as a very high performance backbone network services (vBNS) network. Also as shown, network 140 may also include topology extractor 112, which is described below in greater detail.

Topology domain 130 may include network topologies for one or more networks. Topology domain 130 may be a service or circuit that includes a network environment. The network topology for each network may include a collection of interconnected network elements (e.g., nodes or electronic components). The network elements may be connected by communication channels, links, etc. Communication channels in particular networks may be identified based on sending and receiving network elements that may be associated with particular applications.

Topology domain 130 may also provide an interface via which commands may be executed for particular network elements. For example, topology domain 130 may receive commands from topology management system 102 for network elements in a particular network, such as a re-boot command for an optical network terminal (ONT) in a customer premises network.

As shown, topology domain 130 may include network topology information for networks in one or more domains 132a-132n, such as a customer premises domain 132a, a provider domain 132b, or a distributor domain 134n, etc. Domains 132a-132n are subdomains of topology domain 130 and may contain networks implemented for particular circuits and/or services. For example, customer premises domain 132a may include network topology for a customer premises network (not shown in FIG. 1). The network elements in the customer premises network may include ONTs, set top boxes (STBs), routers, etc. Similarly, provider domain 132b may include network topology information for a provider network (not shown). Further domains 132a-132n may include network topology for a telephone service network, an internal communications network, a supply chain network, a sub network, etc.

According to one embodiment, domains 132a-132n may include a supply chain. The supply chain may include a factory, a warehouse, a distribution network, and a retail outlet. The factory may send a product to the warehouse. The warehouse may send the product to the distribution network. The distribution network may send the product to the retail outlet, to be purchased by a customer. The network elements in this instance may include inventory management systems, retail devices, etc.

Topology management system 102 may provide a standardized platform to display or represent network topologies for networks in domain 130 in diagrammatic views with specific attributes of each network element. The attributes may be customized based on specific requirements in particular applications and/or end users. Topology management system 102 may be a centralized system that provides network topologies for a variety of applications and users. Topology management system 102 may create a variety of visual representations for the same network topology in different information technology (IT) applications or systems. Topology management system 102 may be applied at a single point to determine and display a common (or overlapping) network topology instead of having multiple systems determine network topologies independently for particular applications. Topology management system 102 may be based on a web based platform or framework, such as Java/Java 2 platform, enterprise edition (J2EE), active server pages (ASP)/.NET, ColdFusion, Perl/Unix, etc.

Topology management system 102 may extract network topology information from topology domain 130 using a topology extractor 112, for instance via network 140. Topology extractor 112 may be a point of entry into topology domain 130 through which network topology information may be extracted for a particular network or circuit. The network topology information may include an inventory of network elements in each network 132 and interconnections between the network elements. The network topology information may also include physical topology information, such as a physical location of each element in network 132 and/or logical topology information, such as a direction of data flow in network 132.

Topology extractor 112 may provide a web service that gathers network topology information from topology domain 130 for identified networks. In one implementation, topology extractor 112 may extract the network topology information as raw extensible markup language (XML) data. Topology management system 102 may communicate with topology domain 130 over network 140 to receive the network topology information.

Topology management system 102 may include a processing module 104, an imaging module 106, an element control module 108, and a database 110. Processing module 104 may render a diagrammatic view of network topology for a network in domain 130. Processing module 104 may render the network topology in a variety of different formats, such as hypertext markup language (HTML), small web format (SWF), scalable vector graphics (SVG) formats. Processing module 104 may provide options to select a format for rendering the diagrammatic view of the network topology, thereby enabling developers to choose a format in representing the network topology within their applications. Processing module 104 may be a modular tool. For instance, processing module 104 may apply a rendering format based on a particular format selected by an end user.

Processing module 104 may access network topology information for a particular network in topology domain 130, via topology extractor 112. Alternatively, processing module 104 may access topology information, for a network in domain 130, which is stored in an associated database 110. Network topology information for the network elements may include connections to other network elements in each network, directions of flows for data information, etc., in each network. Network topology information for each network may include a network identifier (ID) for the circuit and topology domain 130.

Processing module 104 may identify connections (e.g., representing links, communication channels, etc.) between multiple network elements and display the network elements in a logical format. For example, processing module 104 may display network elements in a sequence based on data received and processed by each network element in a network topology. For example, processing module 104 may display network elements in a sequence based on different attributes of input to (and output from) the network elements. Processing module 104 may identify different connections between network elements in a same domain. Processing module 104 may also identify connections by ports at the networks elements.

Processing module 104 may render a diagrammatic view of the network topology based on relevant network elements and connection types for a particular application or end user. For example, a connection may include both an electrical connection and a data transfer connection in different applications. If an application is associated with an electrical circuit, processing module 104 may render a network topology for the electrical circuit. Processing module 104 may render the diagrammatic view of the network topology in a format selected by an end user, such as, for instance, a developer or administrator. The diagrammatic view of the network topology may be provided on a user selected device and/or format, such as a mobile device, browser, etc. in flash format, html format, etc.

Imaging module 106 may identify representations for each network element and associate the identified representations with the network element in the diagrammatic view of the network topology. For example, imaging module 106 may receive a representation of a network element (e.g., a representation of a network element may be a picture, video, etc. in a format such as joint photographic experts group (JPEG), graphics interchange format (GIF), moving pictures expert group (MPEG), etc.) and store the representation indexed in association with the network element for a particular representation of the network topology. Imaging module 106 may store images based on particular applications and/or individual users. The representations may be indexed for particular applications and users. Each representation may be applied for categories of network elements or for particular network elements.

Element control module 108 may customize attributes of each network element of the network topology based on particular applications, or user input, and may determine a customized diagrammatic view of the network topology. For example, element control module 108 may determine an attribute, such as visibility of a particular network element in the customized diagrammatic view of the network topology for a particular application. Element control module 108 may store the customized diagrammatic view of the network topology, for instance in a common rendering server. Developers and other end users may access the customized diagrammatic view of the network topology to represent the network topology in their respective graphical user interfaces (GUIs).

Element control module 108 may customize commands for each network element. For example, element control module 108 may allow customization of commands for a network element based on input by a developer, such as business logic applicable to a customized diagrammatic view of the network topology and a particular application or system. Element control module 108 may provide developers with tools and capabilities to develop customized business logic based on each network element.

Element control module 108 may determine parameters and authorizations for implementation of the commands. Element control module 108 may customize privilege levels required to execute and/or see particular commands based on the commands and different privilege levels of users. For example, element control module 108 may limit the users that may restart or reboot a network element. In another example, element control module 108 may determine minimum privilege levels required for users to access performance monitoring statistics.

Element control module 108 may apply or implement a command for a particular network element. Alternatively, element control module 108 may apply commands across different types of nodes in the network.

The developer may base the commands on specific ports of a device. According to one embodiment, element control module 108 may determine commands associated with a digital subscriber line access multiplexer (DSLAM) that provide a capability to trouble shoot the DSLAM. Element control module 108 may customize the type of commands that may execute on the DSLAM. Element control module 108 may provide a flexible options framework for implementing commands associated with the network elements on a port level. User device 120 may include a device that is capable of providing input for topology management system 102. For example, user device 120 may be a computer, phone, tablet, etc. User device 120 may receive/display content from topology management system 102. User device 120 may include a GUI through which a user may select content that may be provided by content provider system 104. According to one embodiment, user device 120 may be implemented in conjunction with topology management system 102 and may be authenticated/identified for administrative level security.

FIGS. 2A-2D are diagrams, 200, 230, 250, 270, showing exemplary diagrammatic views of a network topology 210. Network topology 210 may be rendered for a customer premises network, e.g., a fiber-to-the-premises (FTTP) network, and presented in a display 202. Diagrammatic view of network topology 210 includes, in a logical order, network elements such as an erbium-doped fiber amplifier (EDFA) 212, an ONT 214, router 216, STBs 218a-218n, and a digital video recorder (DVR) 220. Additionally, FIGS. 2A-2D show an attributes table 204 that includes attributes associated with a particular network element in network topology 200, in this instance ONT 214. Although FIGS. 2A-2D illustrate a customer premises network, it should be understood that principles discussed with respect to network topology 210 and ONT 214 may be applied to other networks and network elements.

Figure 2A:
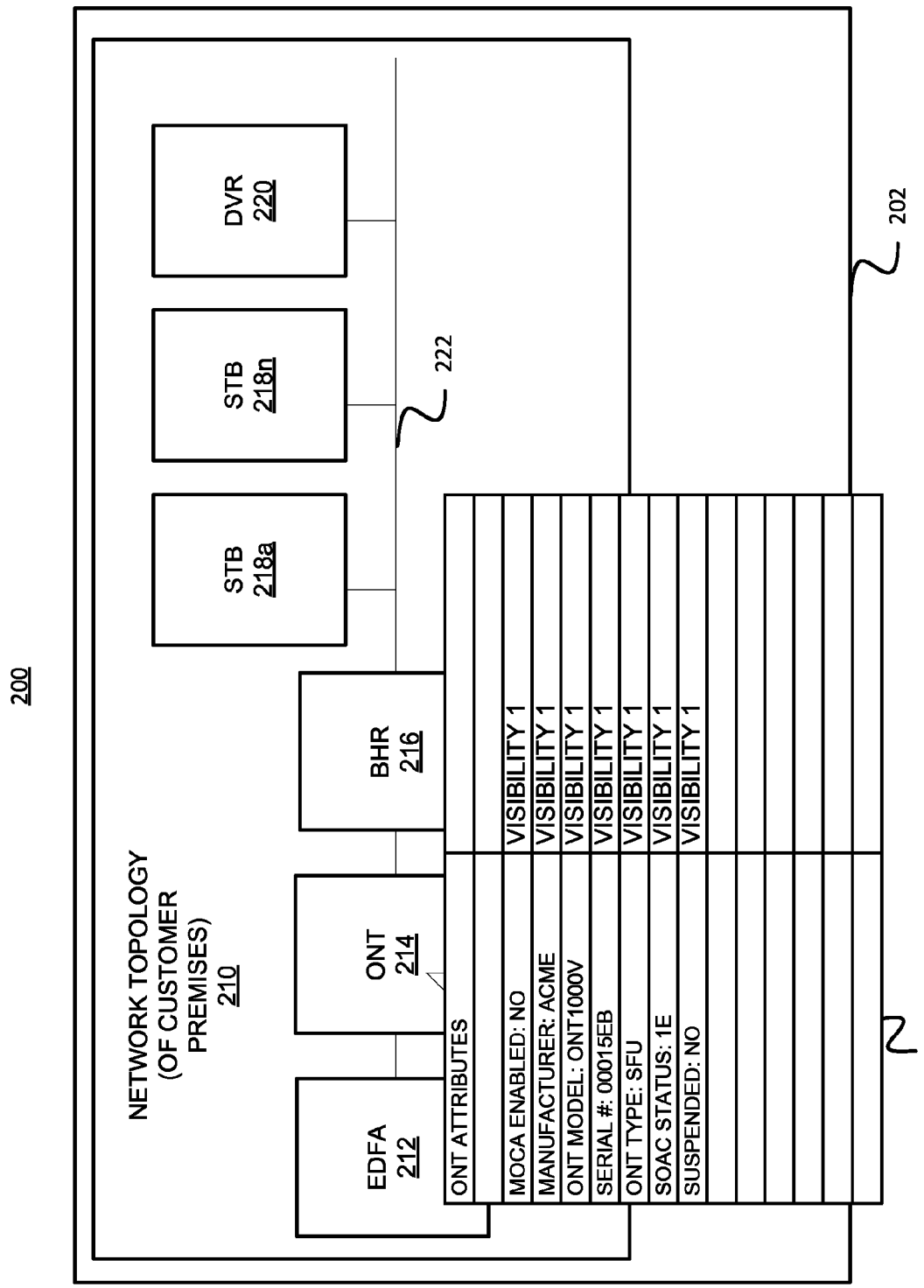
FIG. 2A illustrates an exemplary diagrammatic view of a network topology.

FIG. 2A is diagram 200 illustrating a diagrammatic view of network topology 210 that may be rendered by processing module 104. For example, processing module 104 may receive network topology information for a network (e.g., a network selected from customer premises domain 132a) and render a diagrammatic view of network topology 210 (i.e., a topological map of the network) using the network topology information for customer premises domain 132a.

Processing module 104 may access an inventory of network elements and define connections 222 between the network elements based on the network topology information. For example, processing module 104 may define connections 222 between EDFA 212, ONT 214, router 216, STBs 218a-218n, and DVR 220. Processing module 104 may provide a diagrammatic view of network topology 210 based on logical connections between the network elements.

Each network element may include attributes associated with the network element. The attributes may include identifiers and capabilities of the network element. For example, attributes table 204 shows attributes of ONT 214. ONT 214 is Multimedia over Coax Alliance (MoCA) enabled. The manufacturer of ONT 214 is ACME. The ONT Model of ONT 214 is ONT1000V. The serial number (#) of ONT 214 is 00015EB. The ONT type of ONT 214 is single family unit (SFU). The support service (e.g., service order analysis and control (SOAC)) status is 1E. The suspended status of ONT 214 is No (e.g., service for ONT 214 is active and not suspended).

A visibility setting for each attribute is also shown. The visibility status for all attributes as shown in FIG. 2A is 1. The attribute may be visible for different levels of users of the network topology. The different levels may include an administrative level (7), a developer level (6), and various user levels (5, 4, 3, 2, 1), with lower numbers indicating reduced privileges and capabilities with respect to a diagrammatic view of the network. For example, all attributes of the network element may be visible to an administrative level user (level 7 user). Other levels of users may have reduced capabilities with regard to the diagrammatic view of the network that may be determined by the administrator for the network.

Processing module 104 may provide the diagrammatic view of network topology 210 in multiple different formats, such as HTML, SWF, SVG formats, etc. Different applications (or systems) may select particular formats to render the diagrammatic view of network topology 210 in particular formats based on particular requirements or preferences of the end user, application or system.

Figure 2B:
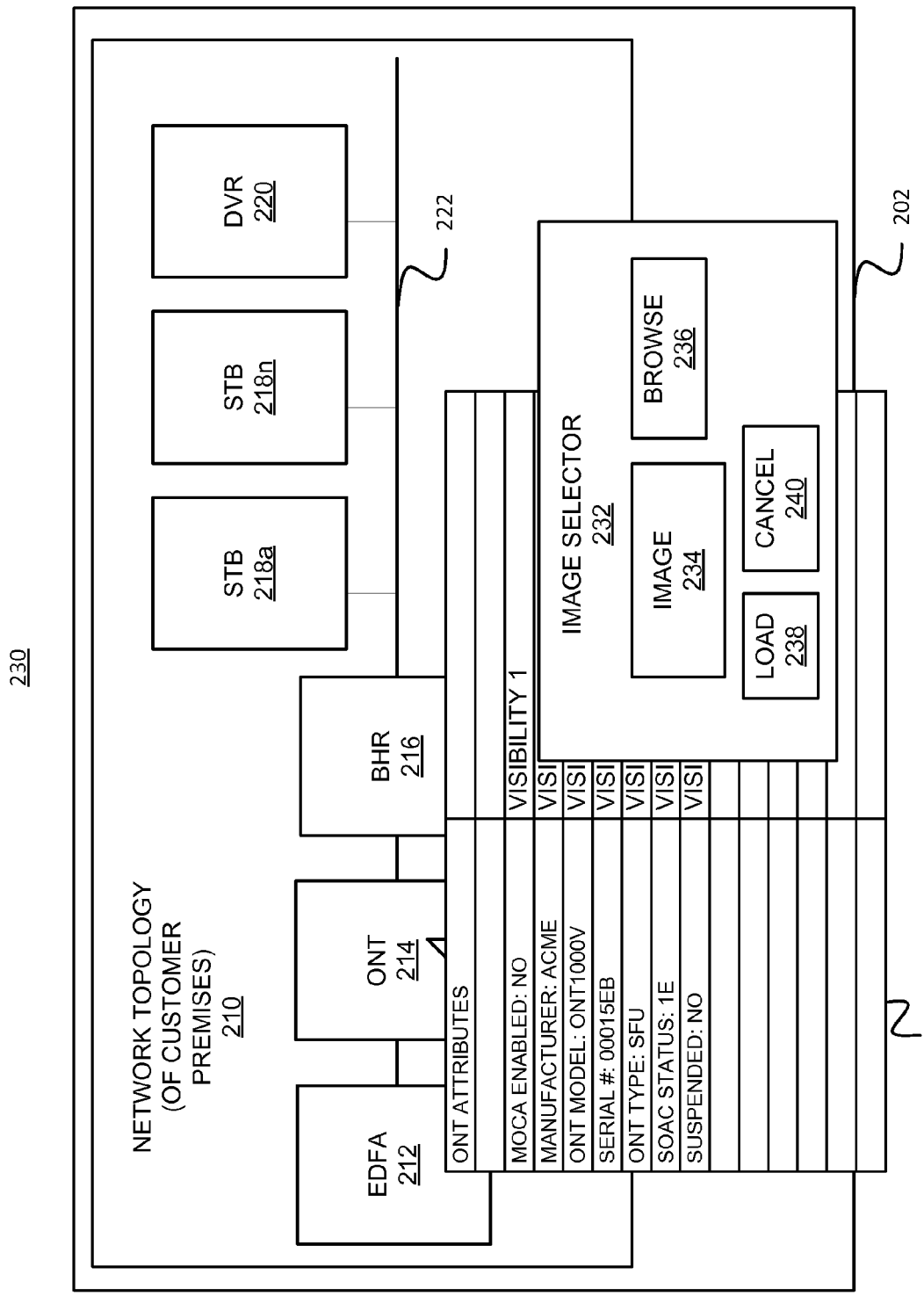
FIG. 2B illustrates an exemplary diagrammatic view of a network topology with administrative information.

FIG. 2B, diagram 230, shows a customized diagrammatic view of network topology 210. Imaging module 106 may select a file (e.g., a JPEG, GIF, MPEG, etc.) to represent network elements in a customized diagrammatic view of network topology 210 using an image selector 232. For example, via image selector 232, an administrator may activate a browse button 236 to browse among images and activate an image button 234 to select an image to represent a network element, for instance, based on a file from an external source such as an administrator database (not shown). In another example, via image selector 232, the administrator may activate a load button 238 or cancel button 240 to load the selected image or cancel the loading of the selected image, if an administrator does not want to associate the image with the network element). The selected image may be associated with the particular network element and stored in an image repository, for instance, in imaging module 106.

Figure 2C:
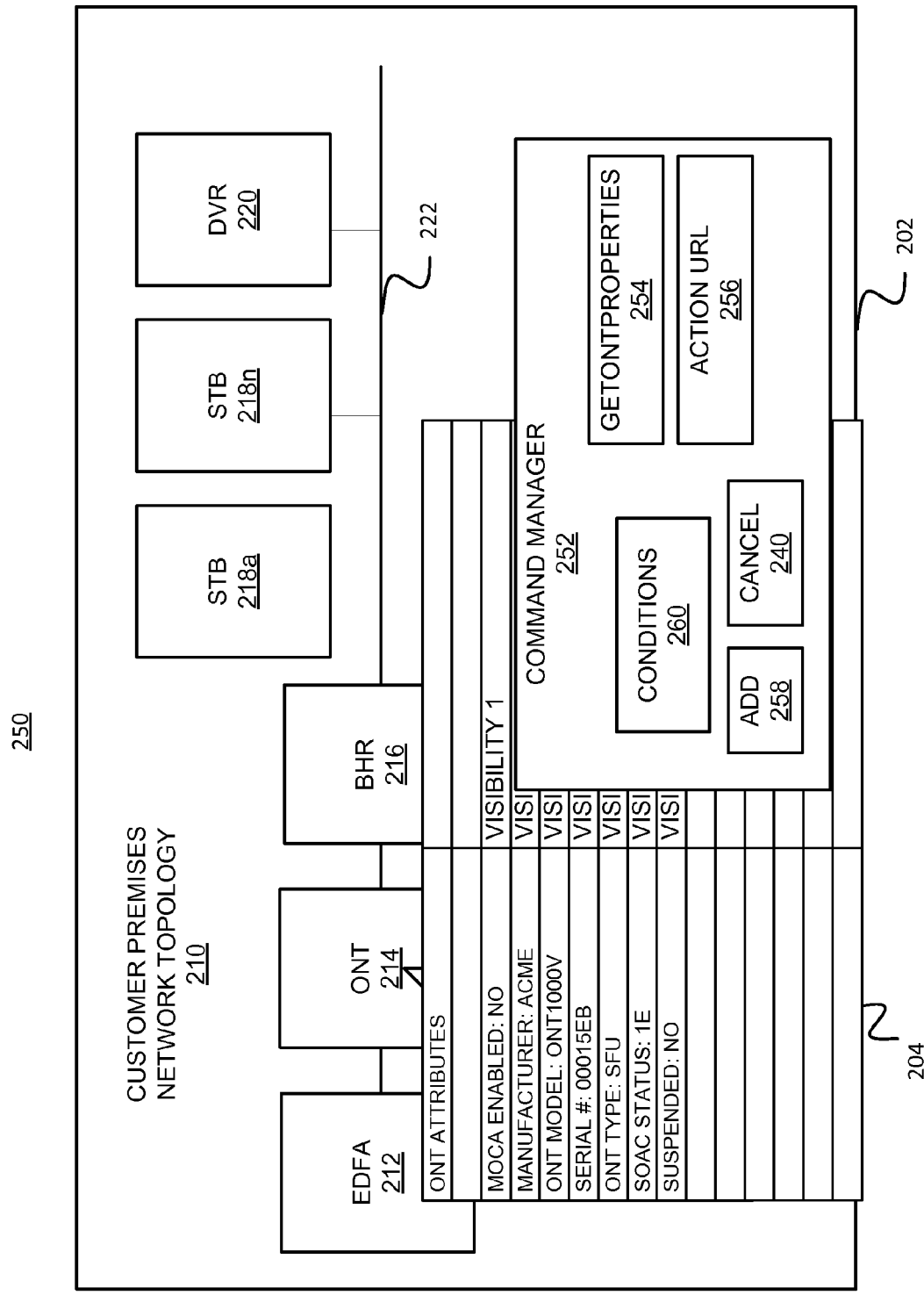
FIG. 2C illustrates another exemplary diagrammatic view of a network topology with administrative information.

FIG. 2C is diagram 250 illustrating a customized diagrammatic view of a network topology 210. Element control module 108 may customize commands associated with each network element. Developers may enter commands for multiple network elements or for individual network elements, for instance, based on particular diagnostic ("trouble shooting") procedures that may be applied to the network elements. Element control module 108 may determine a command for a particular network element, and a framework for implementation of the command, using command manager 252.

According to one embodiment, an administrator may activate an add button 258 to add a command that retrieves properties of ONT 214 (e.g., a command called Get ONT properties 254), using command manager 252. The developer may implement business logic for a particular application programming interface (API) and link to this API with an action uniform resource locator (URL) 256. For example, command manager 252 may provide an option for a developer to link the command to an action URL 256. This may implement the command in a particular implementation of the network topology based on particular application requirements or business logic.

According to one embodiment, action URL 256 may include parameters that provide relevant information for execution of an application based on the network topology. For example, the parameters may include a system identifier (sysId) (e.g., an application identifier), an end user identifier (userId) (e.g. be system specific or end user specific), a circuit identifier (cktId) (i.e., a network or circuit for which network topology is required) and a domain identifier, such as FTTP/SPECIALS/ENTERPRISE etc., in which the domain is an FTTP domain. For example, action URL 256 may be:

http://telecommontool.provider.com/app/open.do?sysId=TPCT&userId=TPCT_AP P&cktId=1010/vaza/2345/vaxa&domain=FTTP.

The developer may also provide specific conditions for implementation of the command, via conditions component 260. For example, the developer may require the network element to be MoCA enabled. The developers may display results of this command in a predetermined customized view, such as a browser or thick clients in various formats or frames as required by design of the application.

Figure 2D:
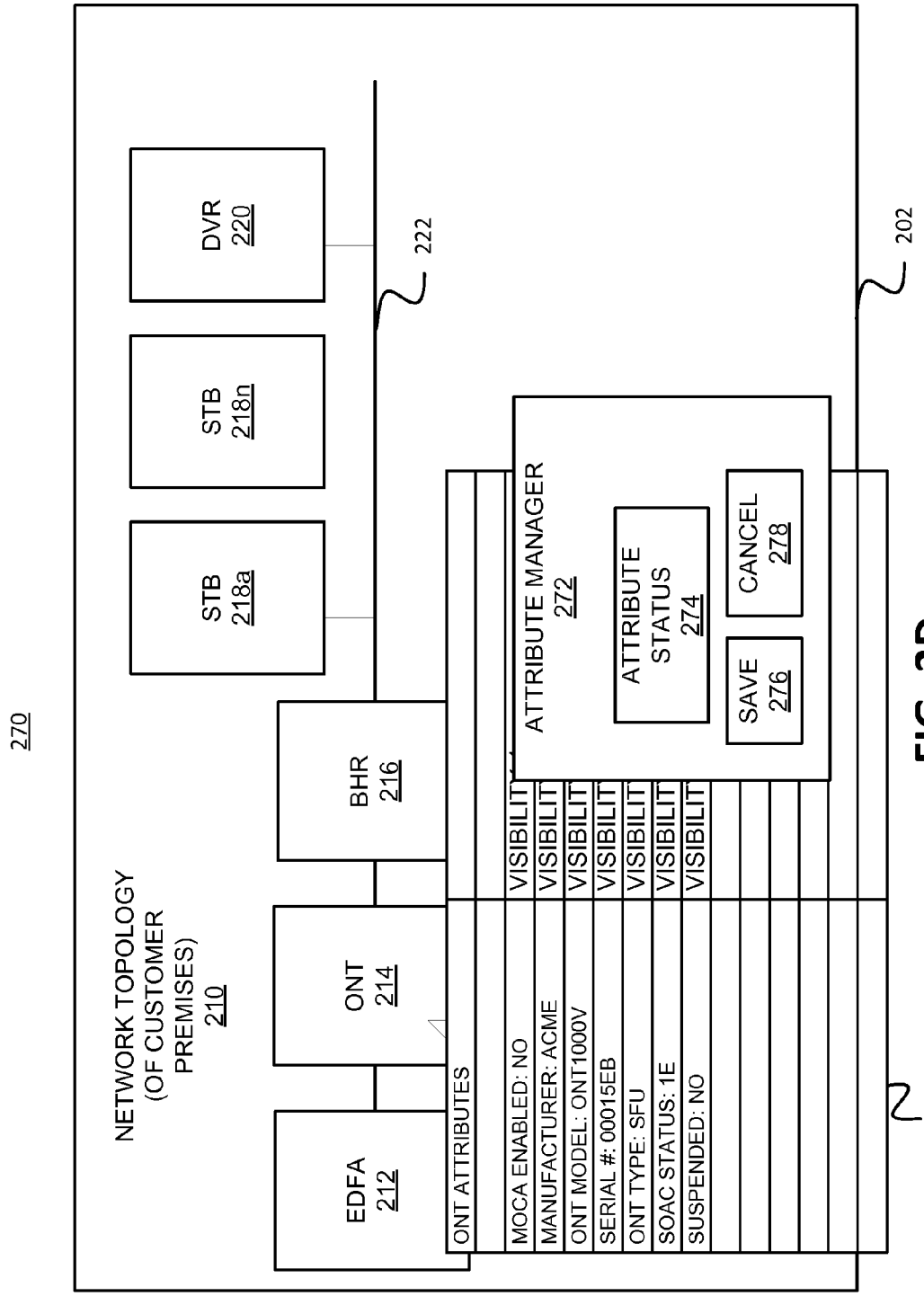
FIG. 2D illustrates yet another exemplary diagrammatic view of a network topology with administrative information.

FIG. 2D is diagram 270 illustrating a customized diagrammatic view of a network topology 210. Element control module 108 may determine attributes for each network element via attribute manager 272. For example, via attribute manager 272, the administrator may determine a change to an attribute status 274 and activate a save button 276 or cancel button 278 to save the determined attribute or cancel changes to the attributes of the network element, if an administrator does not want to change the attributes of the network element. According to one embodiment, element control module 108 may determine (or change) attributes and privilege levels for a specific network element, such as a name, manner of display, etc.

Element control module 108 may also customize attribute visibility based on user privilege levels. For example, element control module 108 may set attributes visibility to a particular level at which users with attributes may be visible to users that have a corresponding minimum privilege level. For example, element control module 108 may set a privilege level for an attribute to level 5. Users with a privilege level of 5 and greater may view the attribute in the customized diagrammatic view of network topology 210.

Figure 3:
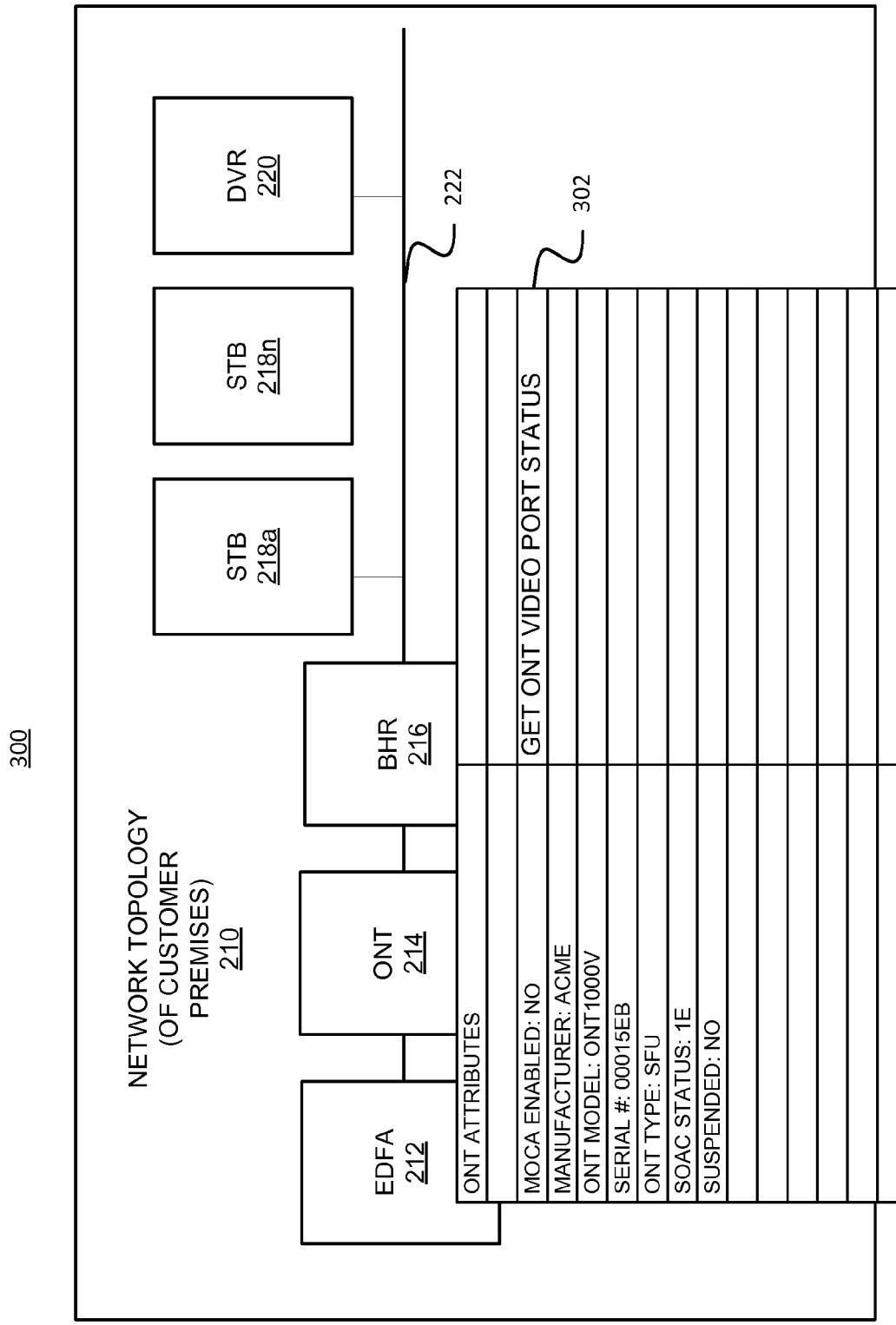
FIG. 3 illustrates an exemplary diagrammatic view of a network topology with user information.

FIG. 3 is a diagram, 300, showing an exemplary diagrammatic view of a network topology 210. Network topology 210 includes EDFA 212, ONT 214, BHR 216, STBs 218a-218n, and DVR 220. FIG. 3 shows information associated with a network element, in this instance ONT 214. Also shown is an attributes table 204 that includes attributes associated with a particular network element in network topology 200, in this instance ONT 214. Although FIG. 3 illustrates a customer premises network, it should be understood that principles discussed with respect to network topology 210 and ONT 214 may be applied to other networks and network elements.

The diagrammatic view of FIG. 3 is a developer view of a customized diagrammatic view of a network topology 210 including a customized network, and a network element (in this instance ONT 214) with associated attributes table 204 and commands. An administrator may provide this customized diagrammatic view of network topology 210 using topology management system 102, which may be accessed by a developer based on required authentication and access privileges. The administrator may limit access privileges and other privileges of the developer with regard to the diagrammatic view of network topology 210.

The developer may use the customized diagrammatic view of the network topology 210 to develop and implement applications based on each network element in the topology. Topology management system 102 may be a common rendering engine for a plurality of applications and/or systems and provide this customized diagrammatic view of the network topology 210 in a run-time environment that includes customized icons, commands and attributes for each application or system.

In some implementations, the developer needs to have a required privilege level for viewing the attributes listed in attributes table 204, as shown in FIG. 3. For example, the visibility level of each attribute may be level 2 and the developer's privilege level may be level 3. If any of the attributes has a visibility level above the developer's privilege level, the particular attribute may not be displayed.

The developer may provide support for implementation of the Get ONT video port status command 302 using an action URL, for instance, as described above with respect to FIG. 2C. The developer may provide machine readable instructions to implement the command for particular applications or systems. The developer may ensure that the machine readable instructions comply with the provided command.

Figure 4:
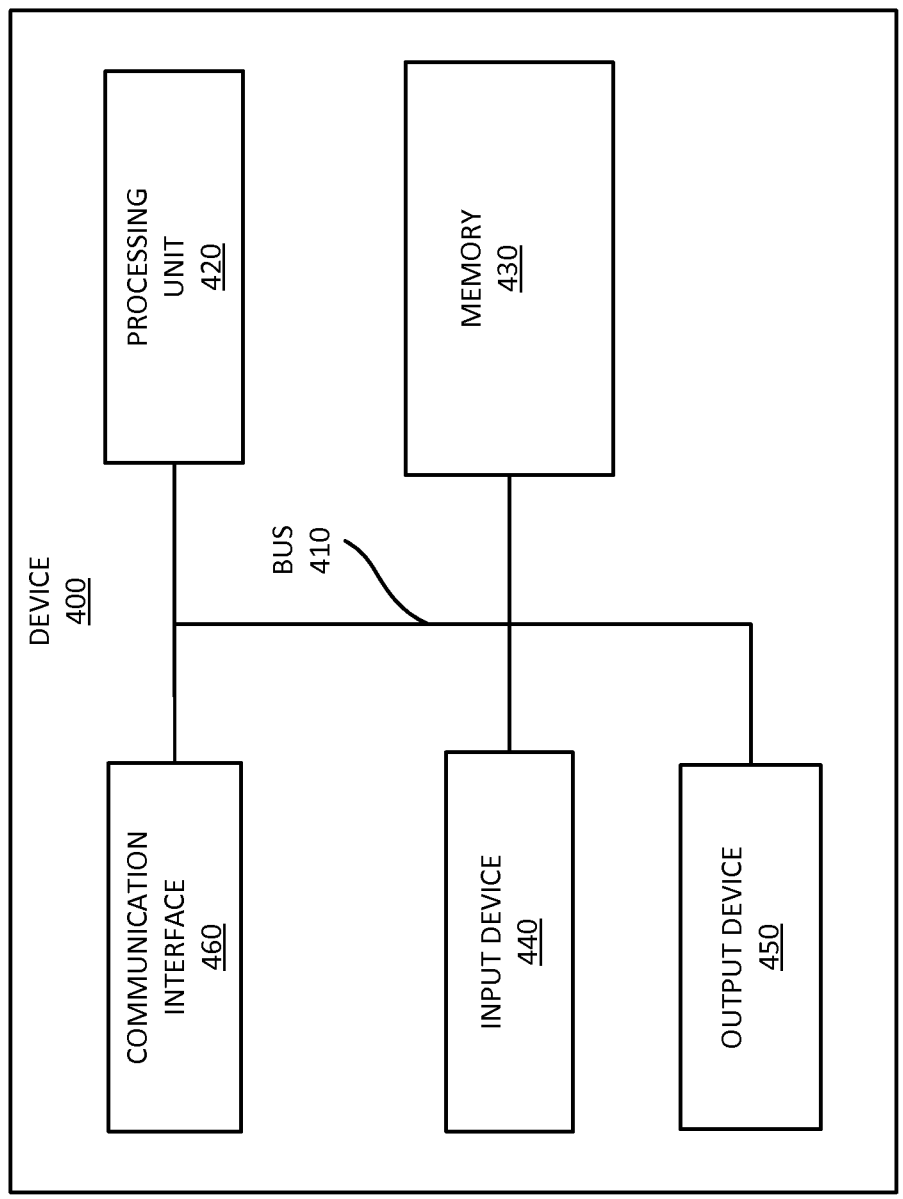
FIG. 4 illustrates an exemplary configuration of one or more of the components of FIG. 1.

FIG. 4 is a diagram of exemplary components of a device 400. User device 120, topology domain 130, and topology management system 102 may include one or more devices 400. As shown in FIG. 4, device 400 may include a bus 410, a processing unit 420, a memory 430, an input device 440, an output device 450, and a communication interface 460. Bus 410 may permit communication among the components of device 400.

Processing unit 420 may include any type of processor or microprocessor that interprets and executes instructions. In other implementations, processing unit 420 may be implemented as or include an application specific integrated circuit (ASIC), field programmable gate array (FPGA), or the like.

Memory 430 may include a random access memory (RAM) or another type of dynamic storage device that stores information and instructions for execution by processing unit 420, a read only memory (ROM) or another type of static storage device that stores static information and instructions for processing unit 420, and/or some other type of magnetic or optical recording medium and its corresponding drive for storing information and/or instructions.

Input device 440 may include a device that permits an operator to input information to device 400, such as a keyboard, a keypad, a mouse, a pen, a microphone, a remote, etc. Output device 450 may include a device that outputs information to the operator, such as a display, a speaker, etc.

Communication interface 460 may include a transceiver (e.g., a transmitter and a receiver) for device 400 to communicate with other devices and/or systems. For example, via communication interface 460, device 400 may communicate over a network, such as the Internet, an intranet, a terrestrial wireless network (e.g., a WLAN, WiFi, WiMax, etc.), a satellite-based network, optical network, etc. Communication interface 460 may include a modem, an Ethernet interface to a LAN, and/or an interface/connection for connecting device 400 to other devices (e.g., a Bluetooth interface).

In an exemplary implementation, device 400 may perform operations in response to processing unit 420 executing sequences of instructions contained in a computer-readable medium, such as memory 430. A computer-readable medium may be defined as a physical or logical memory device. The software instructions may be read into memory 430 from another computer-readable medium (e.g., a hard disk drive (HDD), solid state drive (SSD), etc.), or from another device via communication interface 460. Alternatively, hard-wired circuitry may be used in place of or in combination with software instructions to implement processes consistent with the implementations described herein. Thus, implementations described herein are not limited to any specific combination of hardware circuitry and software.

Figure 5:
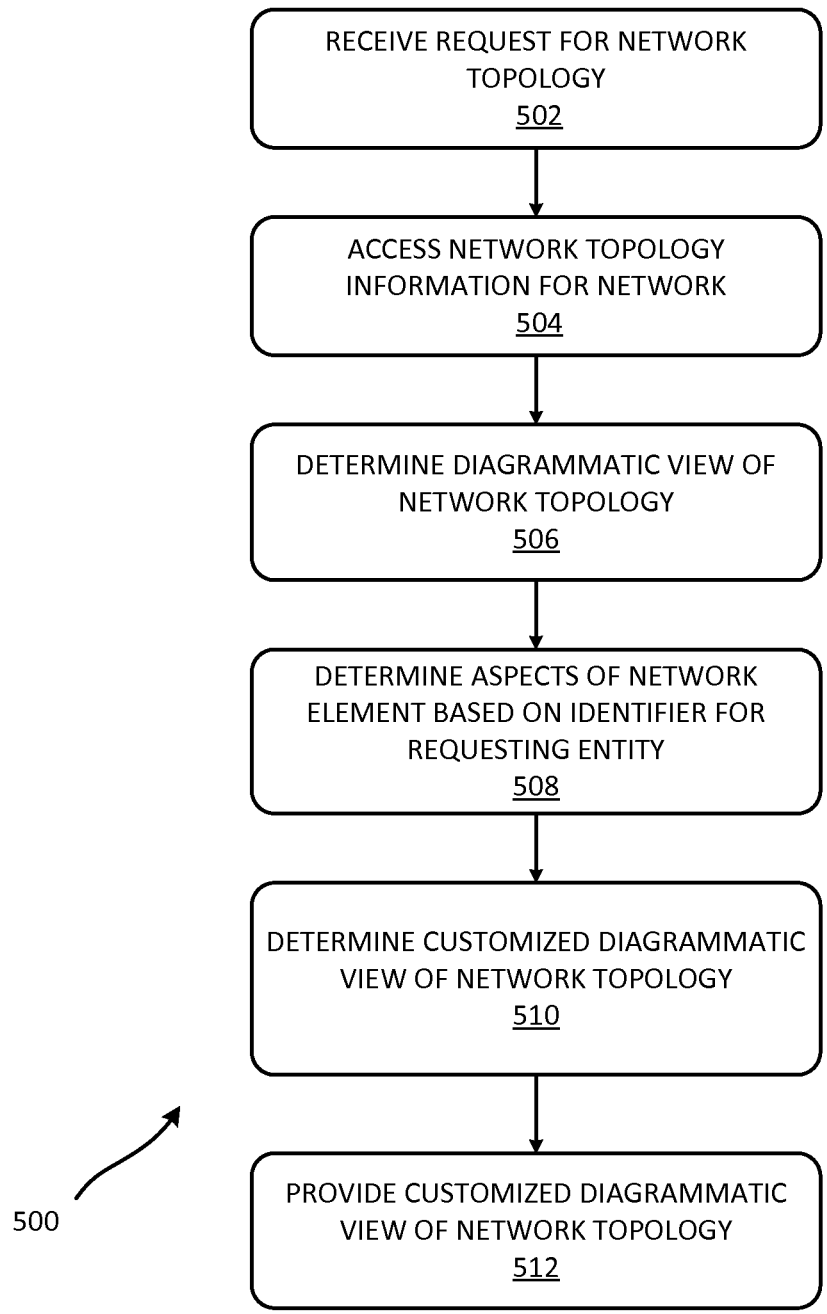
FIG. 5 is a flowchart of an exemplary process for determining topology of a network.

FIG. 5 is a flowchart of an exemplary process 500 for determining a diagrammatic view of a network topology for a network 100. Process 500 may execute in topology management system 102. It should be apparent that the process discussed below with respect to FIG. 5 represents a generalized illustration and that other elements may be added or existing elements may be removed, modified or rearranged without departing from the scope of process 500.

At block 502, processing module 104 may receive a request for network topology information for a particular network in topology domain 130. For example, an administrative user may provide information identifying the network. The request for network topology information may include an identifier of a requesting entity, such as an application, system, or end user. The request for network topology information may also include an identifier for the requested network.

Processing module 104 may extract network topology information for the network from topology domain 130 (block 504), for example, as described below with respect to process 600 and FIG. 6. The network topology information may include a plurality of network elements in the network and a relationship between the network elements. For example, processing module 104 may extract the network topology information using a web services application. The network topology information extracted may be common topology for the network for a plurality of applications and systems.

Processing module 104 may determine a diagrammatic view of the network based on the network topology information for the network (block 506), for example as described below with respect to process 700 and FIG. 7. For example, processing module 104 may connect the network elements based on the topology information to determine the diagrammatic view of the network topology.

Processing module 104 may determine aspects of network elements in the network based on the identifier for the requesting entity (508). The aspects of the network elements may include attributes and commands for each of the network elements. For example, processing module 104 may access attributes and commands corresponding to each of the network elements. Processing module 104 may determine a privilege level and provide the attributes and/or commands accordingly.

At block 510, processing module 104 may form a customized view of network topology 210. For example, processing module 104 may associate the aspects of the network elements with the diagrammatic view of network topology 210 to form the customized diagrammatic view of the network (block 510). For example, processing module 104 may determine attributes and actions for the nodes in the network based on a particular user, system or application. Further, processing module 104 may determine customized commands for each network element.

At block 512, processing module 104 may provide the diagrammatic view of the network topology with network elements that have associated attributes and commands. Processing module 104 may provide the customized diagrammatic view of the network topology, in a particular format, to a requesting entity. Processing module 104 may respond to a requesting entity based on privileges associated with the entity.

Figure 6:
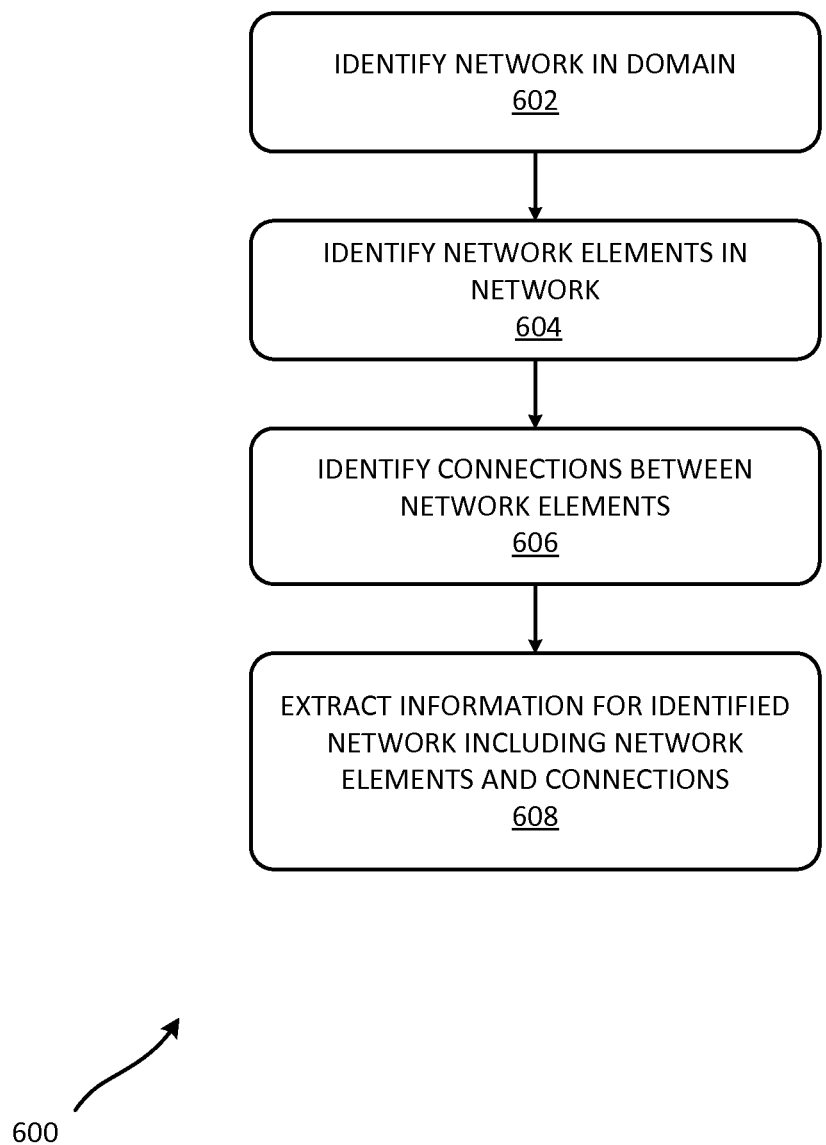
FIG. 6 is a flowchart of an exemplary process for extracting network topology information from a domain.

FIG. 6 is a flowchart of an exemplary process 600 for extracting network topology information from a domain. Process 600 may execute in processing module 104 via topology extractor 112. It should be apparent that the process discussed below with respect to FIG. 6 represents a generalized illustration and that other elements may be added or existing elements may be removed, modified or rearranged without departing from the scope of process 600.

At block 602, processing module 104 may identify a network in topology domain 130, via topology extractor 112. For example, topology extractor 112 may be a web services application that determines network topology information. Processing module 104 may use a network ID for a requested network to identify the requested network in topology domain 130. The network ID may include a circuit ID, a customer premises network ID, etc.

Processing module 104 may identify network elements in the network (block 604). Processing module 104 may identify each network element in the network based on aspects of the network element, such as a type or class of network element and capabilities and configurations of the network element. For example, processing module 104 may identify a network element as a STB, in a customer premises network, which has session shifting capabilities (to other STBs in the customer premises network) that have not been "turned on".

Processing module 104 may identify connections between the network elements (block 606). Processing module 104 may identify relationships between the network elements, such as connections to other network elements in each network, directions of flows of data, etc., in each network.

Processing module 104 may extract network topology information for the network from topology domain 130 (block 608). The network topology information may include information about a plurality of network elements in the network and connections between the network elements. According to one embodiment, the network topology information extracted may be applicable to a plurality of applications and systems.

Figure 7:
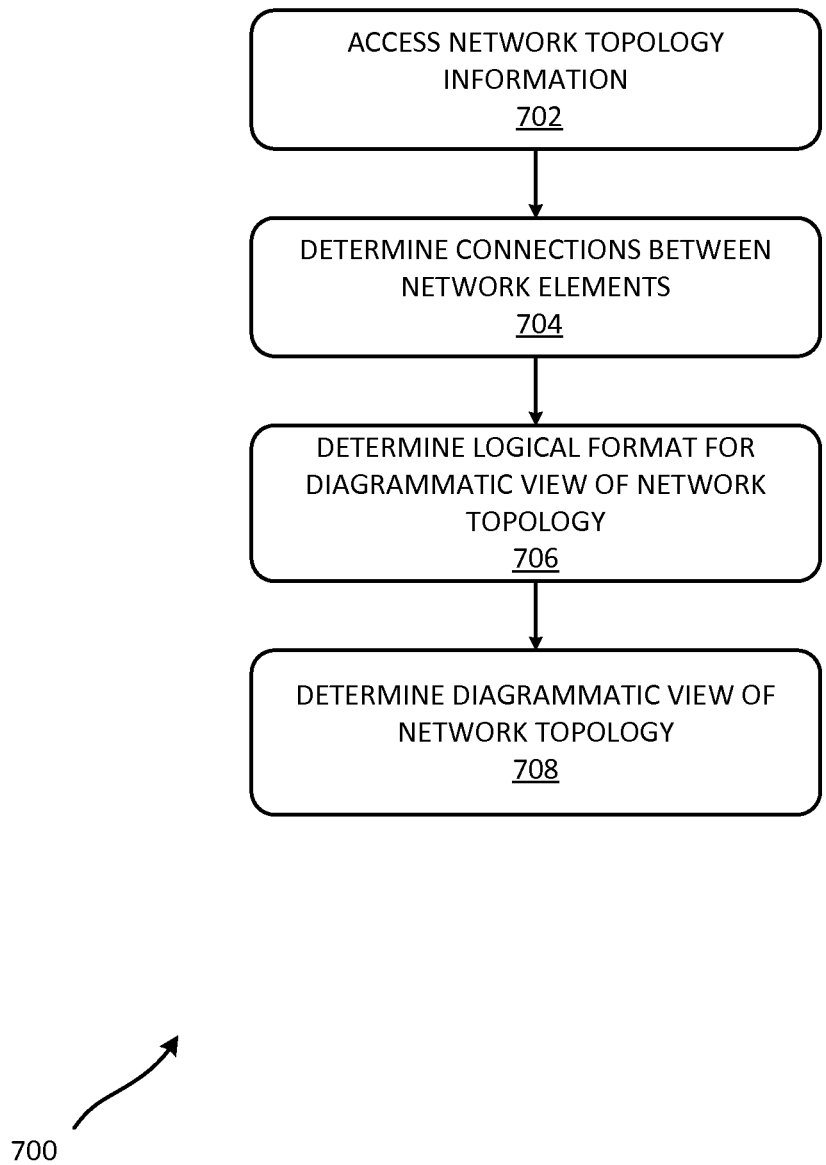
FIG. 7 is a flowchart of an exemplary process for rendering a diagrammatic view of a network topology.

FIG. 7 is a flowchart of an exemplary process 700 for determining a diagrammatic view of the network based on network topology information for the network. Process 700 may execute in processing module 104. It should be apparent that the process discussed below with respect to FIG. 7 represents a generalized illustration and that other elements may be added or existing elements may be removed, modified or rearranged without departing from the scope of process 700.

At block 702, processing module 104 may access network topology information for a particular network in topology domain 130. Processing module 104 may access the network topology information via a topology extractor 112. Alternatively, processing module 104 may access topology information stored in an associated database 110. Network topology information may include information about network elements in the network and connections to other network elements in each network, directions of flows of data, etc., in each network.

Processing module 104 may determine connections (e.g., representing links, communication channels, etc.) between network elements in the network (block 704). Processing module 104 may render connections between network elements based on types and directions of information, etc., which may be communicated/transmitted between network elements. Processing module 104 may also identify connections by ports at the networks elements and render the network topology based on physical location of each network element.

Processing module 104 may determine a logical format for displaying the network topology (block 706). For example, processing module 104 may determine the logical format for displaying the network topology based on user input, general type of network, priority of particular network elements for particular applications, the position of a network in a hierarchy of networks, etc. For example, processing module 104 may determine a "hub and spoke" display format for a network in which the central elements are information producing systems and satellite systems consume the produced data/information.

Processing module 104 may determine a diagrammatic view of the network topology by applying the selected logical format (from block 706) to the network topology information (from block 704). For example, as shown in FIG. 2A, processing module 104 may display network elements of the customer premises network based on a flow of information from an EDFA 212 to an ONT 214 to a BHR 216. Processing module 104 may display an open connection from BHR 216 to other devices in the customer premises network, such as STBs 218a-218n and DVR 220.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments.

For example, while series of blocks have been described with respect to FIGS. 5, 6, and 7, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Although the implementations described above mainly refer to providing a diagrammatic view of a network topology for a customer premises network, in other implementations, network topologies for other types of networks may be provided. The implementations may provide reduced effort and cost of development by using a common rendering engine for a network topology for multiple applications and or systems. The implementations may also provide reduced cost for processing and hardware/storage per application, as all of the customization may be stored in a single repository.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computer-implemented method comprising:
   receiving a request for an overlapping network topology, for a network, wherein the overlapping network topology is usable by a plurality of applications, and the request includes an identifier for a requesting entity and an identifier for the network;
   accessing the overlapping network topology for the network based on the identifier for the network, wherein the overlapping network topology identifies a plurality of network elements in the network and defines a relationship between the network elements;
   determining a customized diagrammatic view of the overlapping network topology based on the requesting entity and the overlapping network topology;
   determining one or more aspects of at least one network element based on the identifier for the requesting entity, wherein the one or more aspects include attributes and commands for the at least one network element;
   associating the one or more aspects to the at least one network element; and
   providing the customized diagrammatic view of the overlapping network topology.

2. The computer-implemented method of claim 1, wherein determining the one or more aspects of at least one network element based on the identifier for the requesting entity further comprises:
   determining the one or more aspects based on a privilege level for the requesting entity.

3. The computer-implemented method of claim 2, wherein determining the one or more aspects based on the privilege level for the requesting entity further comprises:
   determining a visibility of the one or more aspects based on the privilege level for the requesting entity.

4. The computer-implemented method of claim 1, wherein the one or more aspects of the at least one network element comprises a command, the method further comprising:
   receiving an application specific implementation of the command.

5. The computer-implemented method of claim 1, wherein the requesting entity comprises one of an application, a system, or an end user.

6. The computer-implemented method of claim 1, wherein providing the customized diagrammatic view of the network comprises:
   providing the customized diagrammatic view of the overlapping network topology in one of a hypertext markup language (HTML) format, small web format (SWF), or scalable vector graphics (SVG) format.

7. The computer-implemented method of claim 1, wherein accessing the overlapping network topology information further comprises:
   extracting the overlapping network topology from a topology domain via a web services application, wherein the topology domain includes network topology information for networks in a plurality of subdomains that support networks for particular services.

8. The computer-implemented method of claim 1, wherein providing the customized diagrammatic view of the overlapping network topology further comprises:
   providing the customized diagrammatic view of the overlapping network topology in a logical format for displaying the overlapping network topology based on the requesting entity and at least one of a general type of network, priorities of particular network elements for particular applications in the customized diagrammatic view, or a position of the network in a hierarchy of networks.

9. The computer-implemented method of claim 1, wherein the network comprises one of a customer premises network, a supply chain network, a telecommunications provider network, or a distribution network.

10. The computer-implemented method of claim 1, wherein determining the customized diagrammatic view of the overlapping network topology based on the overlapping network topology further comprises:
determining the customized diagrammatic view of the overlapping network topology based on one of a Java platform, an active server pages (ASP) platform, a Cold-Fusion platform, or a Perl platform.

11. The computer-implemented method of claim 1, wherein the overlapping network topology is stored in a common rendering server for the plurality of applications.

12. The computer-implemented method of claim 1, wherein determining the customized diagrammatic view of the overlapping network topology further comprises:
rendering connections between a plurality of network elements based on types and directions of information that is to be transmitted between the plurality of network elements.

13. A device, comprising:
a memory to store a plurality of instructions; and
a processor configured to execute instructions in the memory to:
determine an overlapping network topology for a network wherein the overlapping network topology is usable by a plurality of applications or a plurality of systems;
receive a request for the overlapping network topology, wherein the request includes an identifier for a requesting entity and an identifier for the network;
access the overlapping network topology for the network based on the identifier for the network, wherein the overlapping network topology identifies a plurality of network elements in the network and describes a relationship between the network elements;
determine a customized diagrammatic view of the overlapping network topology based on the network topology for the network;
determine one or more aspects of at least one network element based on the identifier for the requesting entity, wherein the one or more aspects include attributes and commands for the at least one network element;
and
provide the customized diagrammatic view of the overlapping network topology.

14. The device of claim 13, wherein, when determining the one or more aspects of at least one network element based on the identifier for the requesting entity, the processor is further configured to:
determine the one or more aspects based on a privilege level for the requesting entity.

15. The device of claim 14, wherein, when determining the one or more aspects based on the privilege level for the requesting entity, the processor is further configured to determine a visibility level of the one or more aspects based on the privilege level for the requesting entity.

16. The device of claim 14, wherein, when accessing the overlapping network topology information, the processor is further configured to:
extract the overlapping network topology from a topology domain via a web services application.

17. The device of claim 16, wherein, providing the customized diagrammatic view of the overlapping network topology, the processor is further configured to:
provide the customized diagrammatic view of the network topology in a logical format for displaying the overlapping network topology based on a requesting entity.

18. A non-transitory computer-readable medium including instructions to be executed by a processor, the instructions including one or more instructions, when executed by the processor, for causing the processor to:
receive a request for an overlapping network topology, for a network, wherein the request includes an identifier for a requesting entity and an identifier for the network and the overlapping network topology is usable by a plurality of applications;
access the overlapping network topology for the network based on the identifier for the network, wherein the overlapping network topology identifies a plurality of network elements in the network and defines a relationship between the network elements;
determine a customized diagrammatic view of the overlapping network topology based on the requesting entity;
determine one or more aspects of at least one network element based on the identifier for the requesting entity, wherein the one or more aspects include attributes and commands for the at least one network element;
associate the one or more aspects to the at least one network element to form a customized diagrammatic view of the network topology; and
provide the customized diagrammatic view of the network topology.

19. The non-transitory computer-readable medium of claim 18, wherein, when determining the one or more aspects of at least one network element based on the identifier for the requesting entity, the one or more instructions further include instructions, when executed by the processor, for causing the processor to determine the one or more aspects based on a privilege level for the requesting entity.

20. The non-transitory computer-readable medium of claim 19 wherein, when determining the one or more aspects based on the privilege level for the requesting entity, the one or more instructions further include instructions, when executed by the processor, for causing the processor to determine a visibility level of the one or more aspects based on the privilege level for the requesting entity.

* * * * *